US010278531B2

(12) United States Patent
Cummings et al.

(10) Patent No.: US 10,278,531 B2
(45) Date of Patent: May 7, 2019

(54) SYSTEMS AND METHODS FOR MITIGATING UNDESIRED TEMPERATURE CHANGES DURING FOOD PROCESSING

(71) Applicant: Nestec S.A., Vevey (CH)

(72) Inventors: Daniel Louis Cummings, Fremont, MI (US); Christopher Paul Mosser, Nunica, MI (US)

(73) Assignee: Nestec S.A., Vevey (CH)

( * ) Notice: Subject to any disclaimer, the term of this patent is extended or adjusted under 35 U.S.C. 154(b) by 786 days.

(21) Appl. No.: 14/145,531

(22) Filed: Dec. 31, 2013

(65) Prior Publication Data
US 2014/0208956 A1 Jul. 31, 2014

Related U.S. Application Data

(60) Provisional application No. 61/758,444, filed on Jan. 30, 2013, provisional application No. 61/807,987, filed on Apr. 3, 2013.

(51) Int. Cl.
A47J 27/04 (2006.01)
A23L 3/00 (2006.01)
G05D 23/19 (2006.01)

(52) U.S. Cl.
CPC ............... A47J 27/04 (2013.01); A23L 3/003 (2013.01); G05D 23/1904 (2013.01)

(58) Field of Classification Search
CPC .......... A47J 27/04; A23L 3/003; G05D 23/19
(Continued)

(56) References Cited

U.S. PATENT DOCUMENTS 4,203,947 A * 5/1980 Young .................. A61L 2/24
422/114
4,830,278 A * 5/1989 Kohmura .............. A23L 3/10
422/105
(Continued)

FOREIGN PATENT DOCUMENTS

| EP | 0183468 A2 | 6/1986 |
| EP | 1201166 A1 | 5/2002 |
| WO | 0027228 A1 | 5/2000 |

OTHER PUBLICATIONS

International Search Report and Written Opinion from corresponding PCT patent application No. PCT/IB2013/061458 dated Jun. 16, 2014.

Primary Examiner — Ibrahime A Abraham
Assistant Examiner — Biniam B Asmelash
(74) Attorney, Agent, or Firm — Gary M. Lobel, Esq.

(57) ABSTRACT

The present disclosure provides systems and methods for manufacturing food products. In a general embodiment, a system for manufacturing a food product is provided and includes at least one heat exchanger, at least one food product tank, at least one steam source having a steam valve, a computer having a computer processor, and a computer-readable medium accessible to the computer and containing a software program therein that is programmed to cause the computer processor to automatically control the steam valve to move from a first position to a second, calculated position to maintain a temperature of a heating medium that is sufficient to maintain sterility of the food product during a recirculating water-to-food product transition in the heat exchanger. Methods for manufacturing food products are also provided.

11 Claims, 3 Drawing Sheets

(58) Field of Classification Search
USPC .......................................... 99/330, 403, 408
See application file for complete search history.

(56) References Cited

U.S. PATENT DOCUMENTS

| | | | | |
|---|---|---|---|---|
| 5,186,097 A | | 2/1993 | Vaseloffr | |
| 5,361,683 A | * | 11/1994 | Silvestrini | A23B 7/0053 99/330 |
| 5,687,092 A | * | 11/1997 | Bretmersky | G05D 7/0623 118/683 |
| 5,914,255 A | * | 6/1999 | Grae | A23C 3/037 422/21 |
| 6,389,958 B1 | * | 5/2002 | Ono | A23L 3/003 422/105 |
| 6,626,088 B2 | * | 9/2003 | Ono | A23L 3/10 99/330 |
| 7,842,121 B2 | * | 11/2010 | Sanderson | B01D 1/16 165/108 |
| 7,930,911 B1 | * | 4/2011 | Rothrock, Jr. | D06F 39/022 127/28 |
| 2005/0261532 A1 | * | 11/2005 | Stell | C10G 9/00 585/648 |
| 2008/0038150 A1 | * | 2/2008 | Volkov | A23C 3/0375 422/20 |
| 2009/0123341 A1 | * | 5/2009 | Eros | A61L 2/07 422/105 |
| 2010/0082166 A1 | * | 4/2010 | Macharia | G05D 23/1917 700/282 |
| 2012/0255303 A1 | * | 10/2012 | Labbe | F01K 7/40 60/653 |

\* cited by examiner

SYSTEMS AND METHODS FOR MITIGATING UNDESIRED TEMPERATURE CHANGES DURING FOOD PROCESSING

BACKGROUND

The present disclosure relates generally to food technology. More specifically, the present disclosure relates to systems and methods for mitigating the temperature changes that occur during a transition from recirculating water to a food product during aseptic processing of the food product.

Methods of aseptically processing food products are well known. These methods, however, may not always provide optimal results for manufacturing efficiency and/or resulting product quality. For example, during aseptic processing, a food product is typically heated by water, which is heated by steam. Prior to processing of the food product, however, the system is chemically cleaned and rinsed with water. Water is then recirculated through the system to maintain sterility of the system. When the timing is appropriate to introduce the food product into the system, a product tank valve is opened and the initial water/food product interface begins to travel through the system. The interface, however, causes a sudden temperature drop in the system that can cause a loss of sterility of the product. In this regard, there is a temperature minimum that cannot be exceeded at the water/food product interface or the system is susceptible to a loss of sterility, which would result in the process being terminated and a repeat of the system sterilization procedures. Accordingly, loss of sterility can be a timely, inefficient and costly problem for aseptic processes.

Further, large changes in temperature (either losses or gains of temperature) can cause issues with product quality management. For example, if the water/food product interface experiences a large overshoot of temperature at any point during the processing, the food product may be "burnt" or degraded such that the quality of the food product is no longer acceptable. As with the loss of sterility described above, the process would be halted and the resulting product would be discarded. Accordingly, unacceptable product quality could also be a costly problem for such processes.

Therefore, there exists a need for a manufacturing process that is able to mitigate the temperature changes that can occur during aseptic processing of a food product.

SUMMARY

In the present disclosure, systems and methods for manufacturing aseptic food products are provided. In an embodiment, systems for manufacturing a food product are provided and include at least one heat exchanger comprising a heating medium, at least one food product tank, at least one steam source having a steam valve, a computer having a computer processor, and a computer-readable medium accessible to the computer and containing a software program therein that is programmed to cause the computer processor to automatically control the steam valve to move from a first position to a second, calculated position to maintain a temperature of the heating medium that is sufficient to maintain sterility of the food product during a recirculating water-to-food product transition in the heat exchanger.

In an embodiment, the system includes piping connecting the food product tank to the heat exchanger. In another embodiment, the system includes a second heat exchanger. The system may also include piping connecting the heat exchanger to the second heat exchanger.

In an embodiment, the steam source is connected to a heating medium heater such that the steam source provides steam to the heating medium heater to heat the heating medium.

In an embodiment, the software program is programmed to cause the computer processor to open a valve of the food product tank to initiate control of the system to begin a manufacturing process to manufacture the food product.

In an embodiment, the software program is programmed to cause the computer processor to calculate a residence time of a recirculating water/product interface at a predetermined location within the system. The residence time may be calculated as $RT(s)=((V_p \text{ (gal)})\div(FI_p \text{ (gal/min)}))*60 \text{ s/min}$.

In an embodiment, the software program is programmed to set a control variable to zero, wherein the control variable is selected from the group consisting of (i) a one-time temperature measurement of heating medium discharged from the heat exchanger before a recirculating water/food product interface reaches the heat exchanger ("$T_s$"), (ii) a value indicative of a degree of difficulty in heating the food product ("DDV"), (iii) an intermediate temperature value that is equal to a maximum measured temperature of a discharged heating medium ("ITV"), (iv) a value indicative of an increment to the steam valve position necessary to address a temperature upset caused by a water/product separation ("ISVL"), or (v) combinations thereof.

In an embodiment, the software program is programmed to cause the computer processor to continuously calculate a rolling average temperature of heating medium discharged from the heat exchanger before a recirculating water/food product interface reaches the heat exchanger ("$T_{ave}$").

In an embodiment, the software program is programmed to cause the computer processor to calculate a first timing constant that is representative of an optimal time in the manufacturing process to calculate a degree of difficulty ("DDV") in heating the food product in the heat exchanger.

In an embodiment, the software program is programmed to cause the computer processor to measure and store a temperature of heating medium discharged from the heat exchanger before a recirculating water/food product interface reaches the heat exchanger ("$T_s$"), wherein the temperature is stored at the optimal time in the manufacturing process to calculate a degree of difficulty ("DDV") in heating the food product in the heat exchanger.

In an embodiment, the software program is programmed to cause the computer processor to calculate a rate of change of a temperature of the heating medium discharged from the heat exchanger as the food product travels through the heat exchanger ("Slope").

In an embodiment, the software program is programmed to cause the computer processor to calculate an intermediate temperature value ("ITV") according to the formula:

((highest value of a media discharge temperature as a water/product interface passes through the heat exchanger from a first predetermined time to a second predetermined time)−($T_s$)), if >0; or  (i)

0, if ((highest value of a media discharge temperature as a water/product interface passes through the heat exchanger from a first predetermined time to a second predetermined time)−($T_s$))<0.  (ii)

In an embodiment, the first predetermined time is the optimal time in the manufacturing process to calculate a degree of difficulty ("DDV") in heating the food product in the heat exchanger.

In an embodiment, the second predetermined time is an optimal time in the manufacturing process to move the steam valve from the second position back to the first position.

In an embodiment, the software program is programmed to cause the computer processor to calculate the degree of difficulty in heating the food product in the heat exchanger ("DDV"). DDV is calculated as DDV=ITV*Slope Tuned.

In an embodiment, the software program is programmed to cause the computer processor to calculate a second timing constant that is representative of an optimal time in the manufacturing process to move the steam valve from the first position to the second position.

In an embodiment, the software program is programmed to cause the computer processor to calculate a minimum incremental to a steam valve position that is necessary to address any upset caused by a water/food product separation ("ISVL$_{min}$").

In an embodiment, the software program is programmed to cause the computer processor to calculate an incremental to a steam valve position ("ISVL"), which is calculated as ISVL=((flow rate of product through the system÷flow rate of product when tuning constants are set)*ISVL$_{min}$)+DDV.

In an embodiment, the software program is programmed to cause the computer processor to calculate the second position of the steam valve ("CVP"), which is calculated as CVP=(the first position of the steam valve)+ISVL.

In an embodiment, the software program is programmed to cause the computer processor to calculate a third timing constant that is representative of an optimal time in the manufacturing process to move the steam valve from the second position to the first position.

In an embodiment, the software program is programmed to cause the computer processor to calculate a fourth timing constant that is representative of an optimal time in the manufacturing process to move the steam valve from the second position to a standard control position.

In an embodiment, the second position of the steam valve provides an amount of steam to the heating medium that is sufficient to maintain sterility of the food product during the recirculating water-to-food product transition in the heat exchanger.

In an embodiment, the steam valve is configured to return to the first position from the second position to prevent a sudden food product temperature increase as the food product completely displaces the recirculating water in the heat exchanger.

In another embodiment, systems for manufacturing a food product are provided. The systems include at least one heat exchanger comprising a heating medium, at least one food product tank, at least one steam source having a steam valve, a computer having a computer processor, and a computer-readable medium accessible to the computer and containing a software program therein that is programmed to cause the computer processor to automatically control the steam valve to move from a first, calculated position to a second position to maintain a temperature of the heating medium that is sufficient to prevent overheating of the food product in the heat exchanger at a time when the food product completely displaces recirculating water in the heat exchanger.

In an embodiment, the system further includes piping connecting the food product tank to the heat exchanger.

In an embodiment, the system further includes a second heat exchanger. The system may also include piping connecting the heat exchanger to the second heat exchanger.

In an embodiment, the steam source is connected to a heating medium heater such that the steam source provides steam to the heating medium heater to heat the heating medium.

In an embodiment, the software program is programmed to cause the computer processor to open a valve of the food product tank to initiate control of the system to begin a manufacturing process to manufacture the food product.

In an embodiment, the software program is programmed to cause the computer processor to calculate a residence time of a recirculating water/product interface at a predetermined location within the system. The residence time is calculated as RT(s)=((V$_p$ (gal))÷(FI$_p$ (gal/min))*60 s/min.

In an embodiment, the software program is programmed to set a control variable to zero, wherein the control variable is selected from the group consisting of (i) a one-time temperature measurement of heating medium discharged from the heat exchanger before a recirculating water/food product interface reaches the heat exchanger ("T$_s$"), (ii) a value indicative of a degree of difficulty in heating the food product ("DDV"), (iii) an intermediate temperature value that is equal to a maximum measured temperature of a discharged heating medium ("ITV"), (iv) a value indicative of an increment to the steam valve position necessary to address a temperature upset caused by a water/product separation ("ISVL"), or (v) combinations thereof.

In an embodiment, the software program is programmed to cause the computer processor to continuously calculate a rolling average temperature of heating medium discharged from the heat exchanger before a recirculating water/food product interface reaches the heat exchanger ("T$_{ave}$").

In an embodiment, the software program is programmed to cause the computer processor to calculate a first timing constant that is representative of an optimal time in the manufacturing process to calculate a degree of difficulty ("DDV") in heating the food product in the heat exchanger.

In an embodiment, the software program is programmed to cause the computer processor to measure and store a temperature of heating medium discharged from the heat exchanger before a recirculating water/food product interface reaches the heat exchanger ("T$_s$"), wherein the temperature is stored at the optimal time in the manufacturing process to calculate a degree of difficulty ("DDV") in heating the food product in the heat exchanger.

In an embodiment, the software program is programmed to cause the computer processor to calculate a rate of change of a temperature of the heating medium discharged from the heat exchanger as the food product travels through the heat exchanger ("Slope").

In an embodiment, the software program is programmed to cause the computer processor to calculate an intermediate temperature value ("ITV") according to the formula:

((highest value of a media discharge temperature as a water/product interface passes through the heat exchanger from a first predetermined time to a second predetermined time)−(T$_s$)), if >0; or   (i)

0, if ((highest value of a media discharge temperature as a water/product interface passes through the heat exchanger from a first predetermined time to a second predetermined time)−(T$_s$))<0.   (ii)

In an embodiment, the first predetermined time is the optimal time in the manufacturing process to calculate a degree of difficulty ("DDV") in heating the food product in the heat exchanger.

In an embodiment, the second predetermined time is an optimal time in the manufacturing process to move the steam valve from the second position back to the first position.

In an embodiment, the software program is programmed to cause the computer processor to calculate the degree of difficulty in heating the food product in the heat exchanger ("DDV"), wherein DDV is calculated as DDV=ITV*Slope Tuned.

In an embodiment, the software program is programmed to cause the computer processor to calculate a second timing constant that is representative of an optimal time in the manufacturing process to move the steam valve from an initial position to the first position.

In an embodiment, the software program is programmed to cause the computer processor to calculate a minimum incremental to a steam valve position that is necessary to address any upset caused by a water/food product separation ("ISVL$_{min}$").

In an embodiment, the software program is programmed to cause the computer processor to calculate an incremental to a steam valve position ("ISVL"), which is calculated as ISVL=((flow rate of product through the system÷flow rate of product when tuning constants are set)*ISVL$_{min}$)+DDV.

In an embodiment, the software program is programmed to cause the computer processor to calculate the first position of the steam valve ("CVP"), which is calculated as CVP=(the initial position of the steam valve)+ISVL.

In an embodiment, the software program is programmed to cause the computer processor to calculate a third timing constant that is representative of an optimal time in the manufacturing process to move the steam valve from the first position to the second position.

In an embodiment, the software program is programmed to cause the computer processor to calculate a fourth timing constant that is representative of an optimal time in the manufacturing process to move the steam valve from the second position to a standard control position.

In an embodiment, the first position of the steam valve provides an amount of steam to the heating medium that is sufficient to maintain sterility of the food product during the recirculating water-to-food product transition in the heat exchanger.

In an embodiment, the steam valve is configured to move to the second position to prevent a sudden food product temperature increase as the food product completely displaces the recirculating water in the heat exchanger.

In yet another embodiment, methods for manufacturing a food product are provided. The methods include providing a food processing system and initiating automatic control of a steam valve by a computer processor. The system includes at least one heat exchanger comprising a heating medium, at least one food product tank, at least one steam source having a steam valve, a computer having a computer processor, and a computer-readable medium accessible to the computer and containing a software program therein that is programmed to cause the computer processor to automatically move the steam valve from a first position to a second position, wherein the second position is determined by adding to the first position of the steam valve an incremental to the steam valve position that adjusts for a temperature change of the heating medium that is caused by a recirculating water/food product separation.

In an embodiment, the first position is a position of the steam valve that is stored at time=0 when the initiating step occurs.

In an embodiment, the steam source is connected to a heating medium heater such that the steam source provides steam to the heating medium heater to heat the heating medium.

In an embodiment, the software program is programmed to cause the computer processor to open a valve of the food product tank to initiate control of the system to begin a manufacturing process to manufacture the food product.

In an embodiment, the software program is programmed to cause the computer processor to calculate a residence time of a recirculating water/product interface at a predetermined location within the system. The residence time is calculated as RT(s)=((V$_p$ (gal))÷(FI$_p$ (gal/min))*60 s/min.

In an embodiment, the software program is programmed to set a control variable to zero, wherein the control variable is selected from the group consisting of (i) a one-time temperature measurement of heating medium discharged from the heat exchanger before a recirculating water/food product interface reaches the heat exchanger ("T$_s$"), (ii) a value indicative of a degree of difficulty in heating the food product ("DDV"), (iii) an intermediate temperature value that is equal to a maximum measured temperature of a discharged heating medium ("ITV"), (iv) a value indicative of an increment to the steam valve position necessary to address a temperature upset caused by a water/product separation ("ISVL"), and (v) combinations thereof.

In an embodiment, the software program is programmed to cause the computer processor to continuously calculate a rolling average temperature of heating medium discharged from the heat exchanger before a recirculating water/food product interface reaches the heat exchanger ("T$_{ave}$").

In an embodiment, the software program is programmed to cause the computer processor to calculate a first timing constant that is representative of an optimal time in the manufacturing process to calculate a degree of difficulty ("DDV") in heating the food product in the heat exchanger.

In an embodiment, the software program is programmed to cause the computer processor to measure and store a temperature of heating medium discharged from the heat exchanger before a recirculating water/food product interface reaches the heat exchanger ("T$_s$"), wherein the temperature is stored at the optimal time in the manufacturing process to calculate a degree of difficulty ("DDV") in heating the food product in the heat exchanger.

In an embodiment, the software program is programmed to cause the computer processor to calculate a rate of change of a temperature of the heating medium discharged from the heat exchanger as the food product travels through the heat exchanger ("Slope").

In an embodiment, the software program is programmed to cause the computer processor to calculate an intermediate temperature value ("ITV") according to the formula:

$$((\text{highest value of a media discharge temperature as a water/product interface passes through the heat exchanger from a first predetermined time to a second predetermined time}) - (T_s)), \text{ if } > 0; \text{ or} \quad (i)$$

$$0, \text{ if }((\text{highest value of a media discharge temperature as a water/product interface passes through the heat exchanger from a first predetermined time to a second predetermined time}) - (T_s)) < 0. \quad (ii)$$

In an embodiment, the first predetermined time is the optimal time in the manufacturing process to calculate a degree of difficulty ("DDV") in heating the food product in the heat exchanger.

In an embodiment, the second predetermined time is an optimal time in the manufacturing process to move the steam valve from the second position back to the first position.

In an embodiment, the software program is programmed to cause the computer processor to calculate the degree of difficulty in heating the food product in the heat exchanger ("DDV"), wherein DDV is calculated as DDV=ITV*Slope Tuned.

In an embodiment, the software program is programmed to cause the computer processor to calculate a second timing constant that is representative of an optimal time in the manufacturing process to move the steam valve from the first position to the second position.

In an embodiment, the software program is programmed to cause the computer processor to calculate a minimum incremental to a steam valve position that is necessary to address any upset caused by a water/food product separation ("ISVL$_{min}$").

In an embodiment, the software program is programmed to cause the computer processor to calculate an incremental to a steam valve position ("ISVL"), which is calculated as ISVL=((flow rate of product through the system÷flow rate of product when tuning constants are set)*ISVL$_{min}$)+DDV.

In an embodiment, the software program is programmed to cause the computer processor to calculate the second position of the steam valve ("CVP"), which is calculated as CVP=(the first position of the steam valve)+ISVL.

In an embodiment, the software program is programmed to cause the computer processor to calculate a third timing constant that is representative of an optimal time in the manufacturing process to move the steam valve from the second position to the first position.

In an embodiment, the software program is programmed to cause the computer processor to calculate a fourth timing constant that is representative of an optimal time in the manufacturing process to move the steam valve from the second position to a standard control position.

In an embodiment, the second position of the steam valve provides an amount of steam to the heating medium that is sufficient to maintain sterility of the food product during the recirculating water-to-food product transition in the heat exchanger.

In an embodiment, the steam valve is configured to return to the first position from the second position to prevent a sudden food product temperature increase as the food product completely displaces the recirculating water in the heat exchanger.

In still yet another embodiment, methods for manufacturing a food product are provided. The methods include providing a computer having (i) a computer processor and (ii) a computer-readable medium accessible to the computer and containing a software program therein that is programmed to cause the computer processor to calculate a residence times of the food product in each of a plurality of locations in a food processing system, hold a steam valve at a first position that is determined by standard processing controls, determine a one-time temperature measurement of a heating medium as it is discharged from a heat exchanger in the system, calculate a degree of difficulty in heating the food product as the food product starts to pass through the heat exchanger, and calculate a second position for the steam valve to maintain a temperature of the heating medium that is sufficient to maintain sterility of the food product during a recirculating water-to-food product transition in the heat exchanger, wherein the second position is based on the degree of difficulty. The methods further include initiating automatic control of the steam valve by the computer processor to move the steam valve to the second position.

In an embodiment, the steam source is connected to a heating medium heater such that the steam source is configured to provide steam to the heating medium heater to heat the heating medium.

In an embodiment, the software program is further programmed to cause the computer processor to open a valve of the food product tank to initiate control of the system to begin a manufacturing process to manufacture the food product.

In an embodiment, the software program is programmed to cause the computer processor to calculate a residence time of a recirculating water/product interface at a predetermined location within the system. The residence time is calculated as RT(s)=((V$_p$ (gal))÷(FI$_p$ (gal/min))*60 s/min.

In an embodiment, the software program is programmed to set a control variable to zero, wherein the control variable is selected from the group consisting of (i) a one-time temperature measurement of heating medium discharged from the heat exchanger before a recirculating water/food product interface reaches the heat exchanger ("T$_s$"), (ii) a value indicative of a degree of difficulty in heating the food product ("DDV"), (iii) an intermediate temperature value that is equal to a maximum measured temperature of a discharged heating medium ("ITV"), (iv) a value indicative of an increment to the steam valve position necessary to address a temperature upset caused by a water/product separation ("ISVL"), and (v) combinations thereof.

In an embodiment, the software program is programmed to cause the computer processor to continuously calculate a rolling average temperature of heating medium discharged from the heat exchanger before a recirculating water/food product interface reaches the heat exchanger ("T$_{ave}$").

In an embodiment, the software program is programmed to cause the computer processor to calculate a first timing constant that is representative of an optimal time in the manufacturing process to calculate a degree of difficulty ("DDV") in heating the food product in the heat exchanger.

In an embodiment, the software program is programmed to cause the computer processor to measure and store a temperature of heating medium discharged from the heat exchanger before a recirculating water/food product interface reaches the heat exchanger ("T$_s$"), wherein the temperature is stored at the optimal time in the manufacturing process to calculate a degree of difficulty ("DDV") in heating the food product in the heat exchanger.

In an embodiment, the software program is programmed to cause the computer processor to calculate a rate of change of a temperature of the heating medium discharged from the heat exchanger as the food product travels through the heat exchanger ("Slope").

In an embodiment, the software program is programmed to cause the computer processor to calculate an intermediate temperature value ("ITV") according to the formula:

((highest value of a media discharge temperature as a water/product interface passes through the heat exchanger from a first predetermined time to a second predetermined time)−(T$_s$)), if >0; or     (i)

0, if ((highest value of a media discharge temperature as a water/product interface passes through the heat exchanger from a first predetermined time to a second predetermined time)−(T$_s$))<0.     (ii)

In an embodiment, the first predetermined time is the optimal time in the manufacturing process to calculate a degree of difficulty ("DDV") in heating the food product in the heat exchanger.

In an embodiment, the second predetermined time is an optimal time in the manufacturing process to move the steam valve from the second position back to the first position.

In an embodiment, the software program is programmed to cause the computer processor to calculate the degree of difficulty in heating the food product in the heat exchanger ("DDV"), wherein DDV is calculated as DDV=ITV*Slope Tuned.

In an embodiment, the software program is programmed to cause the computer processor to calculate a second timing constant that is representative of an optimal time in the manufacturing process to move the steam valve from the first position to the second position.

In an embodiment, the software program is programmed to cause the computer processor to calculate a minimum incremental to a steam valve position that is necessary to address any upset caused by a water/food product separation ("$ISVL_{min}$").

In an embodiment, the software program is programmed to cause the computer processor to calculate an incremental to a steam valve position ("ISVL"), which is calculated as ISVL=((flow rate of product through the system÷flow rate of product when tuning constants are set)*$ISVL_{min}$)+DDV.

In an embodiment, the software program is programmed to cause the computer processor to calculate the second position of the steam valve ("CVP"), which is calculated as CVP=(the first position of the steam valve)+ISVL.

In an embodiment, the software program is programmed to cause the computer processor to calculate a third timing constant that is representative of an optimal time in the manufacturing process to move the steam valve from the second position to the first position.

In an embodiment, the software program is programmed to cause the computer processor to calculate a fourth timing constant that is representative of an optimal time in the manufacturing process to move the steam valve from the second position to a standard control position.

In an embodiment, the second position of the steam valve provides an amount of steam to the heating medium that is sufficient to maintain sterility of the food product during the recirculating water-to-food product transition in the heat exchanger.

In an embodiment, the steam valve is configured to return to the first position from the second position to prevent a sudden food product temperature increase as the food product completely displaces the recirculating water in the heat exchanger.

An advantage of the present disclosure is to provide improved food manufacturing processes.

Another advantage of the present disclosure is to provide improved aseptic food processing procedures.

Yet another advantage of the present disclosure is to provide methods for manufacturing a food product that mitigate temperature changes during processing.

Still yet another advantage of the present disclosure is to provide methods for manufacturing a food product that reduce the risk of a loss of sterility during manufacturing.

Another advantage of the present disclosure is to provide methods for manufacturing an aseptic food product that reduce the risk of overheating a food product during manufacture.

Yet another advantage of the present disclosure is to provide methods for controlling an aseptic food product manufacturing line.

Additional features and advantages are described herein, and will be apparent from the following Detailed Description and the figures.

DETAILED DESCRIPTION

Figure 1:
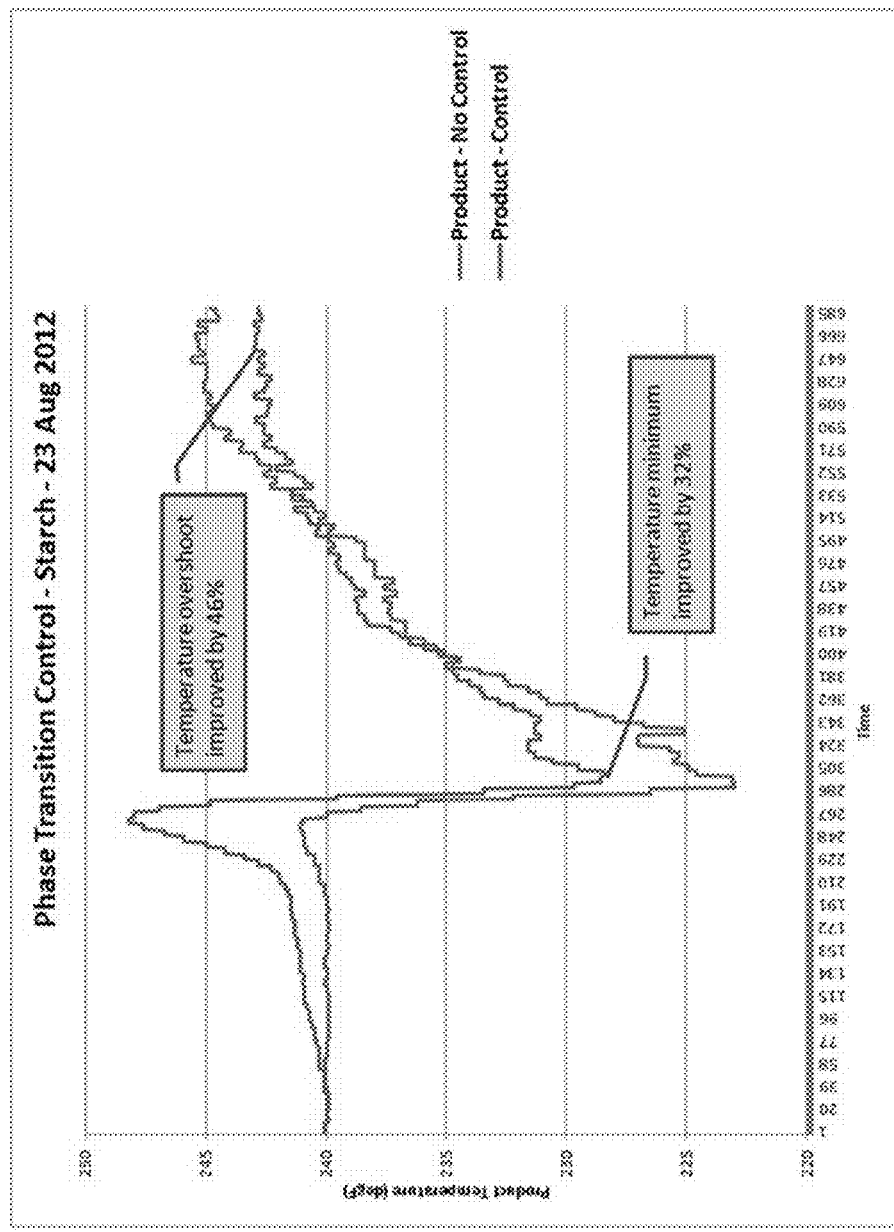
FIG. 1 illustrates the results of (i) a standard process run of a starch and water solution through a typical aseptic system with standard controls and (ii) a controlled performance run of an identical starch and water solution through an identical aseptic system with the improved controls of the present disclosure in accordance with an embodiment of the present disclosure.

As used in this disclosure and the appended claims, the singular forms "a," "an" and "the" include plural referents unless the context clearly dictates otherwise.

As used herein, "about" is understood to refer to numbers in a range of numerals. Moreover, all numerical ranges herein should be understood to include all integer, whole or fractions, within the range.

As used herein, "CVP" is understood to mean the current valve position of a steam valve of a steam source as determined at a specific time in the food processing process.

As used herein, "DDV" is understood to mean a value indicative of the degree of difficulty in heating a food product in the heat exchanger.

As used herein, "$FI_c$" is understood to mean the initial position of the steam valve that is manually set at time=0 to a specific position. The position is stored at t=0 and held constant until a predetermined time. The position is determined by standard aseptic processing parameters.

As used herein, "$FI_p$" is understood to mean the flow indication (or flow rate) of the product as it travels through the food processing system.

As used herein, "ISVL" is understood to mean the incremental steam valve position, which is a value indicative of the incremental to the steam valve position needed to address any temperature upset caused by the water/food product separation during processing.

As used herein, "$ISVL_{min}$" is a tuning constant that is understood to mean the minimum increment to steam valve position necessary to account for the water/food product separation. $ISVL_{min}$ is a number representative of a percentage that is the smallest movement required to adjust for the water/product separation in order to prevent drastically over-compensating for temperature changes and, thereby, wasting energy. The skilled artisan will appreciate that any food product, even one that is easy to heat, requires a minimum increment to steam valve position, which is most heavily influenced by the size of the heat exchanger. This tuning constant is scaled for different flow rates of product through the heat exchanger by the value (flow rate of product during processing÷flow rate of product during determination of the tuning constants). Accordingly, the skilled artisan will appreciate that a lower flow rate requires a lower $ISVL_{min}$, and vice versa.

As used herein, "ITV" is understood to mean intermediate temperature value, which is equal to ((the highest value of temperature measurement of the heating medium discharge temperature from the heat exchanger as the water/food product interface passes through the heat exchanger) minus ($T_s$)).

As used herein, "recirculating water" is understood to mean water that is recirculating in the portion of a heat exchanger that will contain a food product during processing of the food product. The skilled artisan will appreciate that prior to processing of a food product the system is chemically cleaned and rinsed with water and water is then recirculated through the system to keep the system sterile. When the timing is appropriate to introduce the food product into the system, a product tank valve is opened and the initial recirculating water/food product interface begins to travel through the system, thereby displacing the recirculating water.

As used herein, "RT" is understood to mean the residence time of the product in a specific section, or combination of sections, of the food processing system.

As used herein, "Slope" is understood to mean the rate of change of temperature of the heating medium discharge temperature as the recirculating water-to-food product interface works its way through the heat exchanger.

As used herein, "Slope Tuned" is a tuning constant that is understood to mean a numerical multiplier of the Slope that is used to account for differences in equipment size (e.g., heat exchangers, piping lengths, steam supply, etc.) used in the food processing system. The skilled artisan will appreciate that this tuning constant adjusts the value of the ISVL, and is most heavily influenced by the medium heater capacity (e.g., size and steam supply). The skilled artisan would understand how to calculate such a tuning constant.

As used herein, "$T_{ave}$" is understood to mean a rolling average temperature measurement of the heating medium discharge temperature from the heat exchanger.

As used herein, "$T_s$" is understood to mean a one-time, stored average temperature value of the heating medium discharged from the heat exchanger ($T_{ave}$), the stored value being read shortly before the water/food product interface enters the heat exchanger.

As used herein, a "timing constant(s)" is a constant representative of a specific time during the food processing that has been determined to be the optimum time that a certain control algorithm action should occur. The timing constants are determined from repeated trial runs of different types of products through the food processing system. These constants adjust the theory to a specific physical installation (i.e., food processing system) with its actual piping lengths, heat exchanger sizes, steam supply sizes, etc. The timing constants also adjust the timing of the steam valve movement so that the movement impacts the product temperature as the water/product interface reaches certain points near or in the heat exchanger. Examples of calculated timing constants of the present disclosure include time=0, 1.17, 1.37, 1.76, and 3.13. These timing constants are multiplied by respective residence time values to adjust the steam valve at the time that the water/produce interface reaches a certain point near or in the heat exchanger. The residence time calculations in turn depend on the actual product flow rate and, thus, provide a flexible time scale for the algorithm.

As used herein, "tuning constants" are understood to mean constants that are determined from repeated trial runs of different types of products through the food processing system. The constants adjust the theory to a specific physical installation (i.e., food processing system) with its actual piping lengths, heat exchanger sizes, steam supply sizes, etc. The skilled artisan would understand how to calculate such tuning constants.

As used herein, "$V_p$" is understood to mean the volume of the product.

Methods of aseptically processing food products are well known. These methods, however, may not always provide optimal results for manufacturing efficiency and/or resulting product quality. For example, during aseptic processing, a food product is typically heated by water, which is heated by steam. Prior to processing of the food product, however, the system is chemically cleaned and rinsed with water. Water is then recirculated through the system to keep the system sterile. When the timing is appropriate to introduce the food product into the system, a product tank valve is opened and the initial water/food product interface begins to travel through the system. The interface, however, causes a sudden temperature drop in the system that could result in the loss of sterility of the product. In this regard, there is a temperature minimum that cannot be exceeded at the interface or the system is susceptible to a loss of sterility, which would result in the process being terminated and a repeat of the system sterilization procedures. Accordingly, loss of sterility can be a timely, inefficient and costly problem for aseptic processes.

Further, large changes in temperature (e.g., losses or gains of temperature) can cause issues with product quality management. For example, if the water/food product interface experiences a large overshoot of temperature at any point during the processing, the food product may be "burnt" or degraded such that the quality of the food product is no longer acceptable. As with the loss of sterility described above, the process would be halted and the resulting product would be discarded. Accordingly, unacceptable product quality could also be a costly problem for such processes.

Previously, simple solutions to such issues have been proposed. For example, it is known to slow the flow rate of the water/food product interface or to raise the heater target temperature to avoid a loss of sterility. However, such solutions still risk damaging the food product by overheating, which results in an unacceptable product quality.

In contrast to known methods for avoiding loss of sterility, the present methods minimize the risk of loss of sterility by manipulating the product heating rate for a specific time period. The product heating rate is manipulated to minimize the sharp, transient temperature drop that can occur during the water-to-food product transition. This manipulation is also extended in time to minimize temperature recovery overshoot in the standard controls as the food product completely displaces water in the heat exchanger. The degree of manipulation is determined by the difficulty of product heating, which, in turn, is determined by the rate of change of the heating media discharge temperature from the heat exchanger used in the aseptic processing. As will be discussed further below, the degree of manipulation is indicated by the rate of change in temperature of the heating medium as the water/food product interface works its way through the exchanger.

The product heating rate is manipulated by controlling the steam valve that controls the amount of steam used to heat the heating media (e.g., water) in the heat exchanger, which is used to heat the food product. In other words, the steam valve that controls how much heat is provided to the heating media of the heat exchanger is manipulated at several stages of the manufacturing process in order to prevent drastic rises or decreases in the temperature of the food product. As such, the return to normal operating mode after manipulation of the steam valve is carefully timed to avoid overheating of the product towards the end of the manufacturing process. The specific time period over which the steam valve is controlled was determined by Applicant during experiments that were performed until an optimal temperature response was found, as will be discussed further below.

Accordingly, the processes and methods of the present disclosure advantageously counter the change in heat transfer properties at a water/food product interface during aseptic food processing. The heat transfer properties are countered using preemptive action to control the steam valve for a few minutes after the product valve switch is opened to introduce the food product into the system. As a result, the present processes and methods are able to minimize any adverse transient temperature response of the product heaters in the aseptic process as the system transitions from water to the food product.

Additionally, the processes and methods of the present disclosure provide the advantage of automatic control to maintain sterility of a food processing system, which allows operators to focus on other tasks. In this regard, an operator need only enable the controller and the methods of the present disclosure will run automatically to maintain sterility in the system. For example, systems of the present disclosure may include a computer having a computer processor, and computer-readable medium accessible to the computer and containing a software program therein. The software program may be programmed to cause the computer processor to instruct a component of the system to perform a specific activity. For example, the software program may instruct the computer processor to carry out a number of calculations, take temperature measurements at specific times, move valves to specific positions, look up known values in a look-up table, etc.

Furthermore, the operator is not required to have any prior knowledge of the product properties in order to utilize the present methods, which minimizes raw product variability as a concern. In addition, the control methods reduce the impact on product quality by reducing temperature overshoot that typically occurs with standard process controls as the product completely displaces water in the heat exchanger.

Although the present disclosure is discussed as being utilized in the manufacture of, for example, an aseptic food product through a heat exchanger that is heated by a heating medium, the skilled artisan will appreciate that the presently disclosed methods and processes are not limited to the manufacture of an aseptic food product, and the methods and processes may be used with cooling media in a heat exchanger or similar type devices. Indeed, the methods and processes of the present disclosure can be extended to any other heat exchangers in similar process such as, for example, product coolers. The methods may further be extended to heaters constructed in multiple physical sections as product temperature measurements at the intermediate points between the sections can provide a more accurate indication of the degree of difficulty of heating the food product. Further, although the present disclosure contains discussions of the processing of food products, the skilled artisan will appreciate that any products that are temperature sensitive, or require a certain amount of temperature stability, may be processed according to the systems and methods disclosed herein.

The methods of the present disclosure begin at time ("t") equal to zero (t=0). "t=0" is used herein to define the moment that the product tank valve (e.g., a mix proof valve) is opened to begin flow of the food product into the system that is circulating water. As such, t=0 is the moment that the water/food product interface begins to travel through the processing system, as well as the start time for running the algorithm of the methods of the present disclosure. The algorithm of the present methods will now be explained in further detail below.

At Time Equal to 0

To begin the algorithm at t=0, residence time values (or transportation delay) must be determined for the water/food product interface with respect to each system component. To determine residence time ("RT"), the product volume is divided by the product flow rate ("$FI_p$"). The volume of product ("$V_p$") that can reside in a specific portion of the processing system can be found in known look-up tables. $FI_p$ may be determined by means including, but not limited to, reading from a flow meter, calculated from the characteristics of the product pump, etc. Accordingly, the RT calculation for a component (e.g., piping, etc.) of the processing system is as follows:

$$RT(s)=((V_p(\text{gal}))\div(FI_p(\text{gal/min}))*60 \text{ s/min}.$$

For example, if the food processing system includes a first heater, piping between the first heater and a second heater, and a second heater, the one-time calculation of a RT value would be as follows:

$$RT(s)=RT_{(product\ tank\ valve\ to\ heater\ 1)}+$$
$$RT_{(through\ heater\ 1)}+$$
$$RT_{(through\ any\ piping\ after\ heater\ 1\ and\ before\ heater\ 2)}+$$
$$RT_{(through\ heater\ 2)}.$$

Additionally, at this time in the process, the steam valve is set to hold its current position ("$FI_c$"), which was last determined by the standard control calculations typically used in aseptic food processing and known to the skilled artisan.

Further, at t=0, several control variables are set to zero to begin the controls of the present disclosure. The control variables that are set to zero include (i) a stored value of the average temperature ("$T_{ave}$") of the discharged heating medium taken before the water/product interface is at the heat exchanger ("$T_s$"); (ii) a temperature slope ("Slope") indicative of the degree of difficulty in heating the food product ("DDV"); (iii) an intermediate temperature value equal to the maximum measured temperature of the discharged heating medium ("ITV"); and (iv) a value indicative of the increment to the steam valve position needed to address the temperature upset caused by the water/product separation, Increment to Steam Valve Location ("ISVL"). At this time, the steam valve position, $FI_c$, is also stored for future calculations and held constant until a predetermined time period, which is discussed below. Determination of these process variables at other times in the process will be described further below.

To initiate the beginning of the controls of the present disclosure, product tank valve(s) are opened and the timing of the process and controls begins. The product tank valve(s) of the present disclosure may be, for example, mix proof valves that are known in food processing and can pass liquid from two different sources.

At Time Equal to (1.17)*(RT(s))

The tuning constant of 1.17 is a predetermined tuning constant that is determined by evaluating a number of similar product runs through the food processing system to determine the best (or desired) temperature response. There are at least two criteria that the skilled artisan would look to for a determination of the best, or desired, temperature response. The first criterion is to adjust the timing of the application of the ISVL to minimize the temperature drop caused by the water/food product separation. The second criterion is to adjust the timing of the removal of the ISVL (to return to the original steam valve position, $FI_c$) to minimize the temperature overshoot that occurs on return from the controls of the present disclosure to standard controls. The tuning constant is dependent on the physical size of the heat exchanger and almost independent of the remaining system equipment. All similar such tuning constants disclosed herein (e.g., 1.37, 1.76, 3.13, Slope Tuned, etc.) are calculated in a similar manner.

At this time in the process, the stored value $T_s$ of the rolling average value of the heating medium discharge temperature ("$T_{ave}$") is read. $T_s$ represents the baseline temperature of the heating medium as it exits the heat exchanger for purposes of calculating the degree of difficulty value ("DDV"). $T_s$ is an actual value that is stored for future calculations.

After the above-described temperature measurements are taken, it is possible to determine the degree of difficulty in heating the food product traveling through the system. As stated above, the present methods minimize the risk of loss of sterility by manipulating the product heating rate using the steam valve for a specific time period. The degree of manipulation is determined by the difficulty of product heating which, in turn, is determined by the rate of change of the heating media discharge temperature as the food product works its way through the exchanger ("Slope"). Therefore, the calculation for the degree of difficulty in heating the food product is a continuous calculation that is started at $t=1.17*RT(s)$.

The calculation for the DDV is as follows:

Intermediate Temperature Value ("ITV")=

((highest value of the media discharge temperature as the product interface passes through the heat exchanger from $t=1.17$ to $t=1.76)-(T_s)$), if >0; or (i)

0, if ((highest value of the media discharge temperature as the product interface passes through the heat exchanger from $t=1.17$ to $t=1.76)-(T_s))<0$. (ii)

DDV=ITV*Slope Tuned

At Time Equal to $(1.37)*(RT(s))$

At this time in the process, the continuous calculation of the DDV is stopped and the steam valve is set to a specific position that is determined by a one-time calculation. Up to this point in the process, the steam valve position has been held constant since being stored at time=0 (i.e., $FI_c$). The new position of the steam valve, which is the increment to the steam valve position ("ISVL") that is needed to address the upset caused by the water/food product separation, is ($ISVL_{min}$, scaled by flow, plus the DDV), and is calculated as follows:

ISVL=(($FI_p$÷flow rate (of the product) at which the tuning constants are set)*($ISVL_{min}$))+DDV The value of ($FI_p$÷flow rate at which the tuning constants are set) scales the value of $ISVL_{min}$ by the actual flow rate. The ISVL value is indicative of the amount of steam needed for product heating this time in the process.

Another steam valve calculation is also determined at this time in the process to move the steam valve to a desired position, or current valve position ("CVP"). As mentioned previously, $FI_c$ is the steam valve position stored at t=0 and held constant since that point in time, and ISVL is the increment to the position needed to address the upset cause by the water/product separation. Therefore, the CVP is determined as follows:

CVP=$FI_c$+ISVL

The CVP is achieved using the steam flow controller that normally calculates the position of the steam valve. The control value (i.e., the output signal to the steam valve, usually 0-100% where 100% would be fully open) indicates to the steam flow controller the position to which the steam valve should be moved.

All of the calculations from the start of the algorithm until this point in the process are used to address temperature drop issues that occur as the water/food product interface travels through the processing system. Essentially, the calculations are used to determine the best position at which to place the steam valve to prevent a sudden drop in temperature that can result in a lack of sterility of the food product running through the system. The remaining portions of the algorithm/controls discussed herein below are calculated to address any temperature overshoot towards the end of the food processing when the system controls revert to standard controls.

At Time Equal to $(1.76)*(RT(s))$

Once obtained, the steam valve remains at the CVP until this point in the process, when the steam valve returns to where it was at t=0 (i.e., $FI_c$). The steam valve is moved to this position because it provides a stable position at which to hold the steam valve until the system regains standard controls. Standard controls, or standard operating mode, is understood to mean control values and calculations for typical aseptic food processing parameters. The skilled artisan will appreciate what standard controls for food processing (including, for example, aseptic food processing), would include. At this point in the process, the stored steam valve position $FI_c$ is written to a controller parameter.

At Time Equal to $(3.13)*(RT(s))$

At this time in the process the steam valve moves from wherein it was at t=0 (i.e., $FI_c$), into standard control mode.

Figure 2:
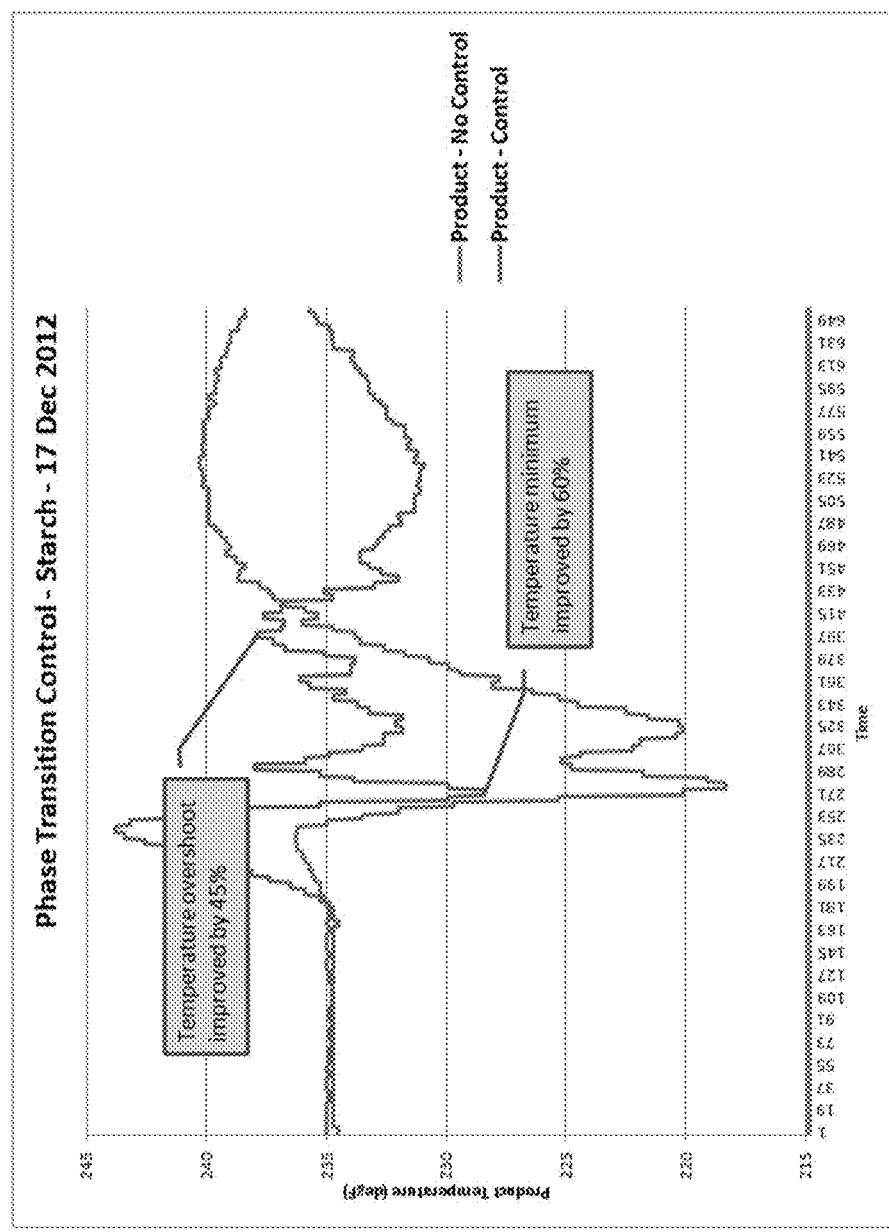
FIG. 2 illustrates the results of (i) a standard process run of a starch and water solution through a typical aseptic system with standard controls and (ii) a controlled performance run of an identical starch and water solution through an identical aseptic system with the improved controls of the present disclosure in accordance with an embodiment of the present disclosure.

FIGS. 1 and 2 demonstrate the advantages of using the control methods disclosed herein. For example, FIG. 1 illustrates the comparative results of (i) a typical aseptic food processing run of a starch and water solution with (ii) an aseptic food processing run of an identical composition of a starch and water solution but run with the improved controls of the present disclosure. As is shown by FIG. 1, the temperature minimum was improved by about 32% and the temperature overshoot towards the end of the process was improved by about 46%.

Similarly, FIG. 2 illustrates the comparative results of (i) a typical aseptic food processing run of a starch and water solution with (ii) an aseptic food processing run of an identical composition of a starch and water solution but run with the improved controls of the present disclosure. As is shown by FIG. 2, the temperature minimum was improved by about 60% and the temperature overshoot towards the end of the process was improved by about 45%.

Figure 3:
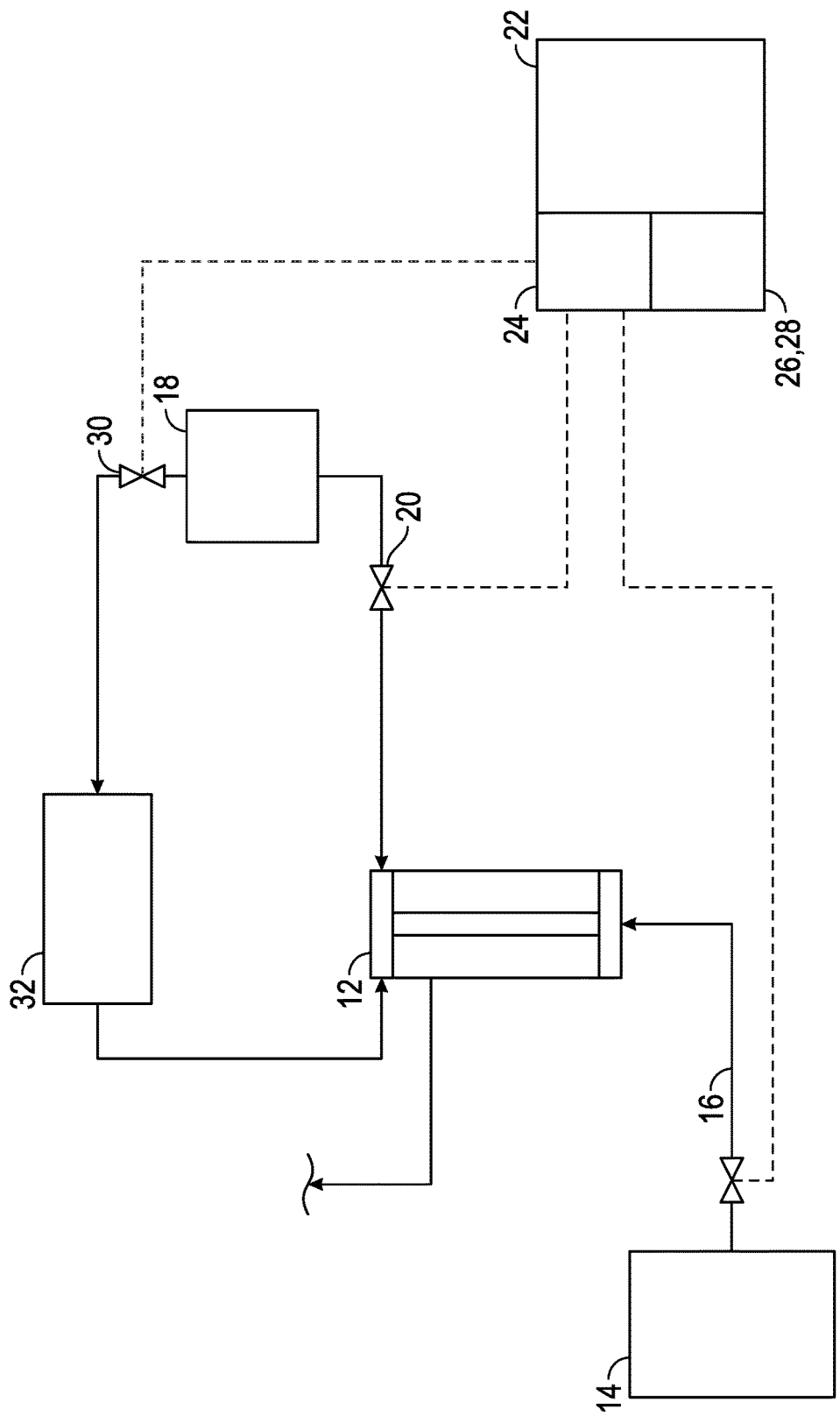
FIG. 3 shows a schematic representation of a food manufacturing process in accordance with an embodiment of the present disclosure.

Referring to FIG. 3, in one embodiment, a system 10 for manufacturing a food product includes at least one heat exchanger 12, at least one food product tank 14, piping 16 connecting the food product tank 14 to the heat exchanger 12, and at least one steam source 18 having a steam valve 20, and a computer 22 having a computer processor 24 and a non-transitory computer-readable medium 26. The non-transitory computer-readable medium 26 contains a software program 28 therein that when executed by the computer processor 24 causes the computer processor 24 to automatically control the steam valve 20 to move from a first position to a second, calculated position to maintain a temperature of the heating medium that is sufficient to maintain sterility of the food product during a recirculating water-to-food product transition in the heat exchanger. The steam valve 20 is configured to return to the first position from the second position to prevent a sudden food product temperature increase as the food product completely displaces the recirculating water in the heat exchanger 12. The software program 28 can be programmed to cause the computer processor 24 to open a valve 30 of the food product tank 14 to initiate control of the system. In one embodiment, the steam source 18 is connected to a heating medium heater 32 to heat the heating medium.

Using the systems and methods of the present disclosure, Applicant has been able to mitigate undesired temperature changes during aseptic food processing. In this regard, Applicant has been able to prevent any sudden temperature drops in the system that can cause a loss of sterility of the product, and has also been able to prevent large changes in temperature (either losses or gains of temperature), which can cause issues with product quality management. The foregoing may be better understood by reference to the following Example, which is presented for purposes of illustration and are not intended to limit the scope of the present disclosure.

EXAMPLE

This Example provides numerical data obtained from a trial run of an aseptic food product though a typical aseptic food processing system. The trial run was performed using a starch and water solution and the system included a pump, piping and one heat exchanger.

| | | t = 0 | | t = 1.17 | t = 1.37 | t = 1.76 | t = 3.13 |
|---|---|---|---|---|---|---|---|
| $T_{meas}$ | current read | 240.4 | | 240.5 | 241.7 | 243.5 | 251.8 |
| $T_{ave}$ | current calc | 238.9 | | 239.1 | | | |
| $T_s$ | initialize | 0 | current calc | 239.1 | 239.1 | 239.1 | 0 |
| ITV | initialize | 0 | | 1.4 | 2.6 | 2.6 | |
| DDV | initialize | 0 | | 5.6 | 10.4 | 10.4 | |
| Slope Tuned | | 4 | | 4 | 4 | | |
| CVP | current read | 42.6 | hold value | 42.6 | 73 | 42.6 | 0 |
| $FI_c$ | initialize | 42.6 | | 42.6 | 42.6 | 42.6 | 0 |
| ISVL | initialize | 0 | | 0 | 30.4 | 30.4 | 0 |

At Time Equal to 0

To begin the algorithm at t=0, residence time values (or transportation delay) must be determined for the water/food product interface with respect to each system component. To determine Residence Time ("RT"), the product volume is divided by the product flow rate ("$FI_p$"), which, in this Example, is 4.0 gal/min. The residence times are calculated as follows:

$$RT(s) = ((V_p(\text{gal})) \div (FI_p(\text{gal/min}))) * 60 \text{ s/min}.$$

Also, at this time, temperature measurements are taken, either continuously, or on a one-off basis. Specifically, the heating medium discharge temperature (i.e., as the heating medium is discharged from the heat exchanger) begins to be measured continuously and is measured over the entire time period of the food processing. A one-time temperature measurement is taken and, in this Example, is 240.4° F.

A calculation of the continuous average heating medium discharge temperature is also started at this time and continues over the entire time period of the food processing. A one-time average temperature measurement is taken and, in this Example, is 238.9° F.

The steam valve is set to hold its current position ("$FI_c$"="CVP"), which was last determined by the standard control calculations and, in this Example, is 42.6%.

Further, several control variables are set to zero to begin the controls of the present disclosure. The control variables that are set to zero include (i) a stored value of the average temperature ("$T_{ave}$") of the discharged heating medium taken before the water/product interface is at the heat exchanger ("$T_s$"); (ii) a temperature slope ("Slope") indicative of the degree of difficulty in heating the food product ("DDV"); (iii) an intermediate temperature value equal to the maximum measured temperature of the discharged heating medium; and (iv) a value indicative of the increment to the steam valve position needed to address the temperature upset caused by the water/product separation, increment to steam valve location ("ISVL"). At this time, $FI_c$ (i.e., 42.6%) is also stored for future calculations and held constant until a predetermined time period, which is discussed below.

To initiate the beginning of the controls of the present disclosure, product tank valve(s) are opened and the timing of the process and controls begins. The product tank valve(s) of the present disclosure may be, for example, mix proof valves that are known in food processing and can pass liquid from two different sources.

At Time Equal to (1.17)*(RT(s))

The tuning constant of 1.17 in this Example is a predetermined tuning constant that was determined by evaluating a number of similar product runs to determine the best (or desired) temperature response. There are at least two criteria that the skilled artisan would look to for a determination of the best, or desired, temperature response. The first criterion is to adjust the timing of the application of the ISVL to minimize the temperature drop caused by the water/food product separation. The second criterion is to adjust the timing of the removal of the ISVL (to return to the original steam valve position, $FI_c$) to minimize the temperature overshoot that occurs on return from the controls of the present disclosure to standard controls. The tuning constant is dependent on the physical size of the heat exchanger and almost independent of the remaining system equipment.

Also, at this time, the heating medium discharge temperature (i.e., as the heating medium is discharged from the heat exchanger) continues to be measured. A one-time temperature measurement is taken and, at this time, is 240.5° F.

The continuous average heating medium discharge temperature also continues to be calculated. A one-time average temperature measurement is taken and, at this time, is 239.1° F. This value is stored for future calculations as $T_s$ and held at this temperature for the remainder of the processing. $T_s$ represents the baseline temperature of the heating medium as it exits the heat exchanger for purposes of calculating the DDV.

The steam valve is still set to hold its current position ("$FI_c$"="CVP"), which is 42.6%.

After the above-described temperature measurements are taken, it is possible to determine the degree of difficulty in heating the food product traveling through the system. The calculation is a continuous calculation that is started at this time and the calculation for the DDV is as follows:

Intermediate Temperature Value ("ITV")=

((highest value of the media discharge temperature as the product interface passes through the heat exchanger from $t=1.17$ to $t=1.76$)$-(T_s)$), if >0; or   (i)

0, if ((highest value of the media discharge temperature as the product interface passes through the heat exchanger from $t=1.17$ to $t=1.76$)$-(T_s)$)<0.   (ii)

DDV=ITV*Slope Tuned

In this Example, the highest value of the medium discharge temperature as the product interface passes through the heat exchanger at t=1.17 is 240.5° F., while $T_s$ is 239.1° F.

Therefore, ITV=(240.5° F.−239.1° F.)=1.4.

As discussed above, the Slope Tuned value is a tuning constant that is a numerical multiplier of the Slope that is used to account for differences in equipment size (e.g., heat exchangers, piping lengths, steam suppliers, etc.) used in the food processing system. The skilled artisan will appreciate that this tuning constant adjusts the value of the ISVL, and is most heavily influenced by the medium heater capacity (e.g., size and steam supply). In the present Example, the Slope Tuned value is 4.

DDV=1.4*4=5.6

At Time Equal to (1.37)*(RT(s))

The tuning constant of 1.37 in this Example is a predetermined tuning constant that was determined by evaluating a number of similar product runs to determine the best (or desired) temperature response. There are at least two criteria that the skilled artisan would look to for a determination of the best, or desired, temperature response. The first criterion is to adjust the timing of the application of the ISVL to minimize the temperature drop caused by the water/food product separation. The second criterion is to adjust the timing of the removal of the ISVL (to return to the original steam valve position, $FI_c$) to minimize the temperature overshoot that occurs on return from the controls of the present disclosure to standard controls. The tuning constant is dependent on the physical size of the heat exchanger and almost independent of the remaining system equipment.

At this time in the process, the heating medium discharge temperature (i.e., as the heating medium is discharged from the heat exchanger) continues to be measured. A one-time temperature measurement is taken and, at this time, is 241.7° F.

The continuous average heating medium discharge temperature is no longer calculated since the one-time average temperature measurement was previously taken and stored as $T_s$, which is 239.1° F.

Therefore, ITV=(241.7° F.−239.1° F.)=2.6.

As discussed above, the Slope Tuned value is a tuning constant that is a numerical multiplier of the Slope that is used to account for differences in equipment size (e.g., heat exchangers, piping lengths, steam suppliers, etc.) used in the food processing system. The skilled artisan will appreciate that this tuning constant adjusts the value of the ISVL, and is most heavily influenced by the medium heater capacity (e.g., size and steam supply). In the present Example, the Slope Tuned value is 4.

DDV=2.6*4=10.4

At this time in the process, the continuous calculation of the DDV is stopped and the steam valve is set to a specific position that is determined by a one-time calculation. Up to this point in the process, the steam valve position has been held constant since being stored at time=0 (i.e., $FI_c$=42.6%). The new position of the steam valve, which is the increment to the steam valve position ("ISVL") that is needed to address the upset caused by the water/food product separation, is calculated as follows:

ISVL=(($FI_p$÷flow rate of the product at which the tuning constants are set)*($ISVL_{min}$))+DDV The value of ($FI_p$÷flow rate at which the tuning constants are set) scales the value of $ISVL_{min}$ by the actual flow rate. In this Example, and as stated previously, $FI_p$ is 4.0 gal/min and the flow rate of the product at which the tuning constants are set is 4.0 gal/min. Therefore $FI_p$/flow rate of the product at which the tuning constants are set=1. The ISVL value is indicative of the amount of steam needed for product heating this time in the process.

As described above, $ISVL_{min}$ is a tuning constant that is the minimum incremental to steam valve position necessary to account for the water/food product separation. $ISVL_{min}$ is a number representative of a percentage that is the smallest movement required to adjust for the water/product separation in order to prevent drastically over-compensating for temperature changes and, thereby, wasting energy. This tuning constant is scaled for different flow rates of product through the heat exchanger by the value (flow rate of product during processing÷flow rate of product during determination of the tuning constants). $ISVL_{min}$, as determined from repeated trials on a specific food processing system with different products, is 20 in this Example.

Therefore, ISVL=((1)*(20))+10.4=30.4

Another steam valve calculation is also determined at this time in the process to move the steam valve to a desired position, or current valve position ("CVP"). As mentioned previously, $FI_c$ is the steam valve position stored at t=0 and held constant since that point in time at 42.6, and ISVL is the increment to the position needed to address the upset cause by the water/product separation, which is 30.4 in this Example. Therefore, the CVP is determined as follows:

CVP=$FI_c$+ISVL

CVP=42.6+30.4=73

The CVP is achieved using the steam flow controller that normally calculates the position of the steam valve. The control value (i.e., the output signal to the steam valve, usually 0-100% where 100% would be fully open) indicates to the steam flow controller the position to which the steam valve should be moved.

All of the calculations from the start of the algorithm until this point in the process are used to address temperature drop issues that occur as the water/food product interface travels through the processing system. Essentially, the calculations are used to determine the best position at which to place the steam valve to prevent a sudden drop in temperature that can result in a lack of sterility of the food product running through the system. The remaining portions of the algorithm/controls discussed herein below are calculated to address any temperature overshoot towards the end of the food processing.

At Time Equal to (1.76)*(RT(s))

The tuning constant of 1.76 in this Example is a predetermined tuning constant that was determined by evaluating a number of similar product runs to determine the best (or desired) temperature response. There are at least two criteria that the skilled artisan would look to for a determination of the best, or desired, temperature response. The first criterion is to adjust the timing of the application of the ISVL to minimize the temperature drop caused by the water/food product separation. The second criterion is to adjust the timing of the removal of the ISVL (to return to the original steam valve position, $FI_c$) to minimize the temperature overshoot that occurs on return from the controls of the present disclosure to standard controls. The tuning constant is dependent on the physical size of the heat exchanger and almost independent of the remaining system equipment.

Once obtained, the steam valve remains at the CVP (i.e., 73%) until this point in the process, when the steam valve returns to where it was at t=0 (i.e., $FI_c$=42.6%). The steam valve is moved to this position because it provides a stable position at which to hold the steam valve until the system reverts to standard controls. Standard controls, or standard operating mode, is understood to mean control values and calculations for typical aseptic food processing parameters. At this point in the process, the stored steam valve position $FI_c$ is written to a controller parameter.

Further, at this time in the process, the heating medium discharge temperature (i.e., as the heating medium is discharged from the heat exchanger) continues to be measured. A one-time temperature measurement is taken and, at this time, is 243.5° F.

The continuous average heating medium discharge temperature is no longer calculated since the one-time average temperature measurement was previously taken and stored as $T_s$, which is 239.1° F. Further, since the steam valve has already moved to CVP of 73% to address temperature drop issues that occur as the water/food product interface travels through the processing system, the calculations of ITV, DDV and ISVL are no longer necessary and are not calculated at this time in the process.

At Time Equal to (3.13)*(RT(s))

The tuning constant of 3.13 in this Example is a predetermined tuning constant that was determined by evaluating a number of similar product runs to determine the best (or desired) temperature response. There are at least two criteria that the skilled artisan would look to for a determination of the best, or desired, temperature response. The first criterion is to adjust the timing of the application of the ISVL to minimize the temperature drop caused by the water/food product separation. The second criterion is to adjust the timing of the removal of the ISVL (to return to the original steam valve position, $FI_c$) to minimize the temperature overshoot that occurs on return from the controls of the present disclosure to standard controls. The tuning constant is dependent on the physical size of the heat exchanger and almost independent of the remaining system equipment.

At this time in the process the steam valve moves from where it was at t=0 (i.e., $FI_c$=42.6%), into the position it occupies in standard control mode.

At this time in the process, the heating medium discharge temperature (i.e., as the heating medium is discharged from the heat exchanger) continues to be measured. A one-time temperature measurement is taken and, at this time, is 251.8° F.

The continuous average heating medium discharge temperature is no longer calculated since the one-time average temperature measurement was previously taken and stored as $T_s$, which is 239.1° F.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for manufacturing a food product, the system comprising:
   at least one heat exchanger comprising a heating medium;
   at least one food product tank;
   piping connecting the food product tank to the heat exchanger;
   at least one steam source having a steam valve;
   a computer having a computer processor; and
   a non-transitory computer-readable medium containing a software program therein that when executed by the computer processor causes the computer processor to calculate a degree of difficulty value ("DDV") in heating the food product in the at least one heat exchanger calculated as an intermediate temperature value "ITV" multiplied by a slope tuned value, where in the sloped tune value is a numerical multiplier of the Slope that is used to account for differences in equipment, and, using at least the calculated DDV, automatically control the steam valve to control steam flow from the steam source to a heating medium heater to maintain a temperature of the heating medium that is sufficient to maintain sterility of the food product during a recirculating water-to-food product transition in the heat exchanger.

2. The system according to claim 1, wherein the software program is programmed to cause the computer processor to open a valve of the food product tank to initiate control of the system to begin a manufacturing process to manufacture the food product.

3. The system according to claim 1, wherein the software program is programmed to cause the computer processor to calculate a residence time of a recirculating water/product interface at a predetermined location within the system.

4. The system according to claim 1, wherein the software program is programmed to set a control variable to zero, wherein the control variable is selected from the group consisting of
   (i) a one-time temperature measurement of heating medium discharged from the heat exchanger before a recirculating water/food product interface reaches the heat exchanger ("Ts"),
   (ii) a value indicative of a degree of difficulty in heating the food product ("DDV"),
   (iii) an intermediate temperature value that is equal to a maximum measured temperature of a discharged heating medium ("ITV"),
   (iv) a value indicative of an increment to the steam valve position necessary to address a temperature upset caused by a water/product separation ("ISVL"), and
   (v) combinations thereof.

5. The system according to claim 1, wherein the software program is programmed to cause the computer processor to continuously calculate a rolling average temperature of heating medium discharged from the heat exchanger before a recirculating water/food product interface reaches the heat exchanger ("Tave").

6. The system according to claim 1, wherein the software program is programmed to cause the computer processor to calculate a first timing constant that is representative of an optimal time in the manufacturing process to calculate the degree of difficulty ("DDV") in heating the food product in the heat exchanger.

7. The system according to claim 1, wherein the software program is programmed to cause the computer processor to measure and store a temperature of heating medium discharged from the heat exchanger before a recirculating water/food product interface reaches the heat exchanger ("Ts"), wherein the temperature is stored at the optimal time in the manufacturing process to calculate the degree of difficulty ("DDV") in heating the food product in the heat exchanger.

8. The system according to claim 1, wherein the software program is programmed to cause the computer processor to calculate a rate of change of a temperature of the heating medium discharged from the heat exchanger as the food product travels through the heat exchanger ("Slope").

9. The system according to claim 1, wherein the software program is programmed to cause the computer processor to calculate an intermediate temperature value ("ITV") according to the formula:

((highest value of a media discharge temperature as a water/product interface passes through the heat exchanger from a first predetermined time to a second predetermined time)−($Ts$)), if >0; or  (i)

0, if ((highest value of a media discharge temperature as a water/product interface passes through the heat exchanger from a first predetermined time to a second predetermined time) ($Ts$))<0.  (ii)

10. The system according to claim 9, wherein the first predetermined time is the optimal time in the manufacturing process to calculate the degree of difficulty ("DDV") in heating the food product in the heat exchanger.

11. The system according to claim 9, wherein the second predetermined time is an optimal time in the manufacturing process to move the steam valve from the second position back to the first position.

* * * * *